(12) United States Patent
Buchaca

(10) Patent No.: US 12,387,207 B2
(45) Date of Patent: Aug. 12, 2025

(54) DIGITAL FINANCIAL MANAGEMENT WITH ACCOUNT BALANCE PREVIEW BY PAIRED USER-AUTHORIZED SECOND CLIENT DEVICE WITHOUT USER AUTHENTICATION

(71) Applicant: Truist Bank, Charlotte, NC (US)

(72) Inventor: Bastien Buchaca, Charlotte, NC (US)

(73) Assignee: Truist Bank, Charlotte, NC (US)

(*) Notice: Subject to any disclaimer, the term of this patent is extended or adjusted under 35 U.S.C. 154(b) by 0 days.

(21) Appl. No.: 18/060,311

(22) Filed: Nov. 30, 2022

(65) Prior Publication Data

US 2024/0177153 A1 May 30, 2024

(51) Int. Cl.
*G06Q 20/40* (2012.01)
*H04W 12/08* (2021.01)
*H04W 12/33* (2021.01)
*H04W 12/50* (2021.01)

(52) U.S. Cl.
CPC ............ *G06Q 20/40* (2013.01); *H04W 12/08* (2013.01); *H04W 12/33* (2021.01); *H04W 12/50* (2021.01)

(58) Field of Classification Search
CPC ...... G06Q 20/40; H04W 12/33; H04W 12/50; H04W 12/08
USPC .......................................................... 705/44
See application file for complete search history.

(56) References Cited

U.S. PATENT DOCUMENTS

| 10,223,689 | B2* | 3/2019 | Muncey | G06Q 20/321 |
| 12,056,683 | B2* | 8/2024 | Muncey | G06Q 20/3224 |
| 2013/0080276 | A1* | 3/2013 | Granbery | G06Q 20/3823 705/39 |
| 2014/0279546 | A1* | 9/2014 | Poole | G06Q 20/308 705/44 |
| 2015/0161587 | A1* | 6/2015 | Khan | G06Q 20/3223 705/44 |
| 2015/0302393 | A1* | 10/2015 | Poole | G06Q 20/40 705/65 |
| 2015/0348009 | A1* | 12/2015 | Brown | G06Q 20/352 705/16 |
| 2015/0350814 | A1* | 12/2015 | Krochmal | H04W 4/80 455/41.2 |

(Continued)

OTHER PUBLICATIONS

Apple Announces Apple Pay "Transforming Mobile Payments With an Easy, Secure & Private Way to Pay", dated Sep. 9, 2014, Nat Kerris, Trudy Muller. (Year: 2014).*

*Primary Examiner* — Hai Tran

(74) *Attorney, Agent, or Firm* — Jordan IP Law, LLC; Michael A. Springs, Esq.

(57) ABSTRACT

An apparatus, computing device, computer program product, and a computer-implemented method for delivering financial services and, more particularly, for facilitating enhanced network communication between a user and a financial institution. The computing device is operable to detect a first client device executing a mobile application associated with a financial institution over a communication network. The computing device is then operable to cause, based on the detection and without user authentication, display of a graphical user interface to visually display on a user interface of a paired, user-authorized client device, an account balance preview of one or more financial accounts held by the user at the financial institution.

15 Claims, 16 Drawing Sheets

(56) References Cited

U.S. PATENT DOCUMENTS

| | | | | |
|---|---|---|---|---|
| 2015/0350865 A1* | 12/2015 | Conn | ............... | H04W 76/14 |
| | | | | 455/41.2 |
| 2016/0132862 A1* | 5/2016 | Poole | ............... | G06K 19/07701 |
| | | | | 705/44 |
| 2016/0171482 A1* | 6/2016 | Muncey | ............... | G06Q 20/204 |
| | | | | 705/44 |
| 2019/0172054 A1* | 6/2019 | Muncey | ............... | G06Q 20/3226 |

* cited by examiner

USER PROFILE SETTINGS

Set up to 5 account balances from your sign-in screen.

Enable account balance preview
501

Save
502

500

USER ACCOUNTS

Set up to 5 account balances from your sign-in screen.

| User Account 1 601 | ⚪ |
| User Account 2 602 | ⚪ |
| User Account 3 603 | ⚪ |
| User Account 4 604 | ⚪ |
| User Account 5 605 | ⚪ |
| User Account 6 606 | ⚪ |

Save
607

Reset
608

Balance Preview

| Account 1 | $11,920.20 |
|---|---|
| 801 | |
| Account 2 | $6,620.01 |
| 802 | |
| Account 4 | $6,1619.69 |
| 803 | |

DIGITAL FINANCIAL MANAGEMENT WITH ACCOUNT BALANCE PREVIEW BY PAIRED USER-AUTHORIZED SECOND CLIENT DEVICE WITHOUT USER AUTHENTICATION

TECHNICAL FIELD

The present disclosure relates to an apparatus, computing device, computer program product, and computer-implemented method for delivering financial services and, more particularly, for facilitating enhanced network communication between a user and a financial institution in a manner that enables selective preview of one or more user account balances by a paired user-authorized second client device without receipt of user authentication credentials.

BACKGROUND

Financial institutions that provide mobile financial services require that a user, upon launching a financial institution mobile application on a client device, under a user authentication process to gain entry and have access to one or more account balances at the financial institution. Completion of the authentication process generally requires that the user provide one or more user credentials (PIN, biometric data, etc.).

SUMMARY

One or more embodiments of the present disclosure relate to a communication environment that facilitates enhanced communication between a financial institution, a first client device, and a paired, second client device over a communication network. Such enhanced communication is in support of user access and user management of one or more financial accounts at the financial institution.

In accordance with one or more embodiments set forth, illustrated, and described herein, upon a detection, by one or more financial institution servers associated with a financial institution, of a launching or execution of a mobile application associated with the financial institution ("financial institution mobile application") by a first client device of a user having one or more financial accounts at the financial institution, the user may enable selective preview of one or more account balances associated with the one or more financial accounts. The selective preview is enabled not only for the first client device, but also any user-authorized second client device that is actively paired with the first client device. Such selective preview of account balances by the first client device and the user-authorized second client device is accomplished without entering user authentication credentials or otherwise logging into the financial institution mobile application.

In accordance with one or more embodiments set forth, illustrated, and described herein, an apparatus comprises one or more of the following: one or more processors; and a non-transitory memory coupled to the one or more processors, the non-transitory memory including a set of instructions of computer-executable program code, which when executed by the one or more processors, cause the apparatus to: detect execution of a mobile application associated with a financial institution on a first client device of a user having one or more financial accounts at the financial institution; detect, responsive to the detection of the execution of the mobile application, a pairing between the first client device and a user-authorized second client device; and cause, based on the detection of the pairing, display of a graphical user interface on a user interface of the user-authorized second client device to visually display one or more account balances associated with the one or more financial accounts.

In accordance with the apparatus, the set of instructions, which when executed by the one or more processors, cause the apparatus to concurrently detect execution of the mobile application and detect the pairing between the first client device and a user-authorized second client device.

In accordance with the apparatus, the user-authorized second client device comprises a wearable electronic device worn by the user.

In accordance with the apparatus, the wearable electronic device comprises a smartwatch.

In accordance with the apparatus, the set of instructions, which when executed by the one or more processors, cause the apparatus to conduct, temporally before displaying the graphical user interface, user profile analysis of user profile data that is stored in the non-transitory memory to determine whether the account balance preview is enabled by the user.

In accordance with the apparatus, the graphical user interface is displayed in response to a determination that the account balance preview is enabled.

In accordance with the apparatus, the graphical user interface is displayed on the user-authorized second client device without receipt of user authentication credentials.

In accordance with the apparatus, the apparatus comprises a computing device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to perform one or more of the following: detect execution of a mobile application associated with a financial institution on a first client device of a user having one or more financial accounts at the financial institution; detect, responsive to the detection of the execution of the mobile application, a pairing between the first client device and a user-authorized second client device; and cause, based on the detection of the pairing, display of a graphical user interface on a user interface of the user-authorized second client device to visually display one or more account balances associated with the one or more financial accounts.

In accordance with the computer program product, the set of instructions, which when executed by the one or more processors, cause the computing device to concurrently detect execution of the mobile application and detect the pairing between the first client device and a user-authorized second client device.

In accordance with the computer program product, the user-authorized second client device comprises a wearable electronic device worn by the user.

In accordance with the computer program product, the wearable electronic device comprises a smartwatch.

In accordance with the computer program product, the set of instructions, which when executed by the one or more processors, cause the computing device to conduct, temporally before displaying the graphical user interface, user profile analysis of user profile data that is stored in the non-transitory memory to determine whether the account balance preview is enabled by the user.

In accordance with the computer program product, the graphical user interface is displayed in response to a determination that the account balance preview is enabled.

In accordance with the computer program product, the graphical user interface is displayed on the user-authorized second client device without receipt of user authentication credentials.

In accordance with one or more embodiments set forth, illustrated, and described herein, a computer-implemented method comprises one or more of the following: detecting, by one or more financial institution servers associated with a financial institution, execution of a mobile application associated with a financial institution on a first client device of a user having one or more financial accounts at the financial institution; detecting, by the one or more financial institution servers in response to the detection of the execution of the mobile application, a pairing between the first client device and a user-authorized second client device; and causing, by the one or more financial institution servers based on the detection of the pairing, display of a graphical user interface on a user interface of the user-authorized second client device to visually display one or more account balances associated with the one or more financial accounts.

In accordance with the computer-implemented method, further comprising concurrently detecting, by the one or more financial institution servers, execution of the mobile application and detect the pairing between the first client device and a user-authorized second client device.

In accordance with the computer-implemented method, the user-authorized second client device comprises a wearable electronic device worn by the user.

In accordance with the computer-implemented method, the wearable electronic device comprises a smartwatch.

In accordance with the computer-implemented method, further comprising conducting, by the one or more financial institution servers temporally before displaying the graphical user interface, user profile analysis of user profile data that is stored in the non-transitory memory to determine whether the account balance preview is enabled by the user.

In accordance with the computer-implemented method, the graphical user interface is displayed in response to a determination that the account balance preview is enabled.

In accordance with the computer-implemented method, the graphical user interface is displayed on the user-authorized second client device without receipt of user authentication credentials.

In accordance with one or more embodiments set forth, illustrated, and described herein, an apparatus comprises one or more of the following: one or more processors; and a non-transitory memory coupled to the one or more processors, the non-transitory memory including a set of instructions of computer-executable program code, which when executed by the one or more processors, cause the apparatus to: detect execution of a mobile application associated with the financial institution on a first client device of a user having one or more financial accounts at the financial institution; detect upon a determination that the user has enabled account balance preview without user authentication, pairing between the first client device and a user-authorized, second client device; cause in response to the detection of the pairing and without receipt of user authentication credentials, display of a GUI on a user interface of the user-authorized second client device to visually display one or more account balances associated with the one or more financial accounts.

In accordance with the apparatus, the set of instructions, which when executed by the one or more processors, cause the apparatus to concurrently detect execution of the mobile application and detect the pairing between the first client device and the user-authorized second client device.

In accordance with the apparatus, the user-authorized second client device comprises a wearable electronic device worn by the user.

In accordance with the apparatus, the wearable electronic device comprises a smartwatch.

In accordance with the apparatus, the set of instructions, which when executed by the one or more processors, cause the apparatus to conduct, temporally before displaying the graphical user interface, user profile analysis of user profile data that is stored in the non-transitory memory to determine whether the account balance preview is enabled by the user.

In accordance with the apparatus, the graphical user interface is displayed in response to a determination that the account balance preview is enabled.

In accordance with the apparatus, the graphical user interface is displayed on the user-authorized second client device without receipt of user authentication credentials.

In accordance with the apparatus, the apparatus comprises a computing device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to perform one or more of the following: detect execution of a mobile application associated with the financial institution on a first client device of a user having one or more financial accounts at the financial institution; detect upon a determination that the user has enabled account balance preview without user authentication, pairing between the first client device and a user-authorized, second client device; cause in response to the detection of the pairing and without receipt of user authentication credentials, display of a GUI on a user interface of the user-authorized second client device to visually display one or more account balances associated with the one or more financial accounts.

In accordance with the computer program product, the set of instructions, which when executed by the one or more processors, cause the computing device to concurrently detect execution of the mobile application and detect the pairing between the first client device and a user-authorized second client device.

In accordance with the computer program product, the user-authorized second client device comprises a wearable electronic device worn by the user.

In accordance with the computer program product, the wearable electronic device comprises a smartwatch.

In accordance with the computer program product, the set of instructions, which when executed by the one or more processors, cause the computing device to conduct, temporally before displaying the graphical user interface, user profile analysis of user profile data that is stored in the non-transitory memory to determine whether the account balance preview is enabled by the user.

In accordance with the computer program product, the graphical user interface is displayed in response to a determination that the account balance preview is enabled.

In accordance with the computer program product, the graphical user interface is displayed on the user-authorized second client device without receipt of user authentication credentials.

In accordance with one or more embodiments set forth, illustrated, and described herein, a computer-implemented method comprises one or more of the following: detecting, by one or more financial institution servers associated with a financial institution, execution of a mobile application associated with the financial institution on a first client device of a user having one or more financial accounts at the financial institution; detecting, by the one or more financial institution servers when the one or more financial institution servers determine that the user has enabled account balance preview without user authentication, pairing between the first client device and a user-authorized, second client device; and causing, by the one or more financial institution servers in response to the detection of the pairing and without receipt of user authentication credentials, display of a GUI on a user interface of the user-authorized second client device to visually display one or more account balances associated with the one or more financial accounts.

In accordance with the computer-implemented method, further comprising concurrently detecting, by the one or more financial institution servers, execution of the mobile application and detect the pairing between the first client device and a user-authorized second client device.

In accordance with the computer-implemented method, the user-authorized second client device comprises a wearable electronic device worn by the user.

In accordance with the computer-implemented method, the wearable electronic device comprises a smartwatch.

In accordance with the computer-implemented method, further comprising conducting, by the one or more financial institution servers temporally before displaying the graphical user interface, user profile analysis of user profile data that is stored in the non-transitory memory to determine whether the account balance preview is enabled by the user.

In accordance with the computer-implemented method, the graphical user interface is displayed in response to a determination that the account balance preview is enabled.

In accordance with the computer-implemented method, the graphical user interface is displayed on the user-authorized second client device without receipt of user authentication credentials.

In accordance with one or more embodiments set forth, illustrated, and described herein, an apparatus comprises one or more of the following: one or more processors; and a non-transitory memory coupled to the one or more processors, the non-transitory memory including a set of instructions of computer-executable program code, which when executed by the one or more processors, cause the apparatus to: detect a current geographic location of a first client device of a user having one or more financial accounts at a financial institution, and a user-authorized second client device; conduct analysis of sensor data, wireless network data, and stored data; calculate, based on the detected current geographic position of the first client device and the user-authorized, second client device, a current distance (Dc) between the first client device and the user-authorized, second client device; conduct a comparison between the calculated distance (Dc) and the predetermined threshold distance (Dt) between the first client device and the user-authorized, second client device; determine whether the calculated distance (Dc) is maintained for a predetermined threshold time period (Tt) when the calculated distance (Dc) is less than or equal to the predetermined threshold distance (Dt); cause a pairing between the first client device and the user-authorized, second client device when the calculated distance (Dc) is maintained for the predetermined threshold time period (Tt); and cause, in response to the pairing and without receipt of user authentication credentials, display of a GUI on a user interface of the user-authorized second client device to visually display one or more account balances associated with the one or more financial accounts.

In accordance with the apparatus, the set of instructions, which when executed by the one or more processors, cause the apparatus to concurrently detect execution of the mobile application and detect the pairing between the first client device and the user-authorized second client device.

In accordance with the apparatus, the user-authorized second client device comprises a wearable electronic device worn by the user.

In accordance with the apparatus, the wearable electronic device comprises a smartwatch.

In accordance with the apparatus, the set of instructions, which when executed by the one or more processors, cause the apparatus to conduct, temporally before displaying the graphical user interface, user profile analysis of user profile data that is stored in the non-transitory memory to determine whether the account balance preview is enabled by the user.

In accordance with the apparatus, the graphical user interface is displayed in response to a determination that the account balance preview is enabled.

In accordance with the apparatus, the graphical user interface is displayed on the user-authorized second client device without receipt of user authentication credentials.

In accordance with the apparatus, the apparatus comprises a computing device.

In accordance with the apparatus, the analysis comprises determining, by the one or more financial institution servers, a current spatial proximity between the first client device and the user-authorized, second client device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to perform one or more of the following: detect a current geographic location of a first client device of a user having one or more financial accounts at a financial institution, and a user-authorized second client device; conduct analysis of sensor data, wireless network data, and stored data; calculate, based on the detected current geographic position of the first client device and the user-authorized, second client device, a current distance (Dc) between the first client device and the user-authorized, second client device; conduct a comparison between the calculated distance (Dc) and the predetermined threshold distance (Dt) between the first client device and the user-authorized, second client device; determine whether the calculated distance (Dc) is maintained for a predetermined threshold time period (Tt) when the calculated distance (Dc) is less than or equal to the predetermined threshold distance (Dt); cause a pairing between the first client device and the user-authorized, second client device when the calculated distance (Dc) is maintained for the predetermined threshold time period (Tt); and cause, in response to the pairing and without receipt of user authentication credentials, display of a GUI on a user interface of the user-authorized second client device to visually display one or more account balances associated with the one or more financial accounts.

In accordance with the computer program product, the set of instructions, which when executed by the one or more processors, cause the computing device to concurrently detect execution of the mobile application and detect the pairing between the first client device and a user-authorized second client device.

In accordance with the computer program product, the user-authorized second client device comprises a wearable electronic device worn by the user.

In accordance with the computer program product, the wearable electronic device comprises a smartwatch.

In accordance with the computer program product, the set of instructions, which when executed by the one or more processors, cause the computing device to conduct, temporally before displaying the graphical user interface, user profile analysis of user profile data that is stored in the non-transitory memory to determine whether the account balance preview is enabled by the user.

In accordance with the computer program product, the graphical user interface is displayed in response to a determination that the account balance preview is enabled.

In accordance with the computer program product, the graphical user interface is displayed on the user-authorized second client device without receipt of user authentication credentials.

In accordance with the apparatus, the analysis comprises determining, by the one or more financial institution servers, a current spatial proximity between the first client device and the user-authorized, second client device.

In accordance with one or more embodiments set forth, illustrated, and described herein, a computer-implemented method comprises one or more of the following: detecting, by one or more financial institution servers associated with a financial institution, a current geographic location of a first client device of a user having one or more financial accounts at the financial institution, and a user-authorized second client device; conducting, by the one or more financial institution servers, analysis of sensor data, wireless network data, and stored data; calculating, by the one or more financial institution servers based on the detected current geographic position of the first client device and the user-authorized, second client device, a current distance (Dc) between the first client device and the user-authorized, second client device; conducting, by the one or more financial institution servers, a comparison between the calculated distance (Dc) and the predetermined threshold distance (Dt) between the first client device and the user-authorized, second client device; determining whether the calculated distance (Dc) is maintained for a predetermined threshold time period (Tt) when the calculated distance (Dc) is less than or equal to the predetermined threshold distance (Dt); causing, by the one or more financial institution servers, a pairing between the first client device and the user-authorized, second client device when the calculated distance (Dc) is maintained for the predetermined threshold time period (Tt); and causing, by the one or more financial institution servers in response to the pairing and without receipt of user authentication credentials, display of a GUI on a user interface of the user-authorized second client device to visually display one or more account balances associated with the one or more financial accounts.

In accordance with the computer-implemented method, further comprising concurrently detecting, by the one or more financial institution servers, execution of the mobile application and detect the pairing between the first client device and a user-authorized second client device.

In accordance with the computer-implemented method, the user-authorized second client device comprises a wearable electronic device worn by the user.

In accordance with the computer-implemented method, the wearable electronic device comprises a smartwatch.

In accordance with the computer-implemented method, further comprising conducting, by the one or more financial institution servers temporally before displaying the graphical user interface, user profile analysis of user profile data that is stored in the non-transitory memory to determine whether the account balance preview is enabled by the user.

In accordance with the computer-implemented method, the graphical user interface is displayed in response to a determination that the account balance preview is enabled.

In accordance with the computer-implemented method, the graphical user interface is displayed on the user-authorized second client device without receipt of user authentication credentials.

In accordance with the computer-implemented method, the analysis comprises determining, by the one or more financial institution servers, a current spatial proximity between the first client device and the user-authorized, second client device.

DRAWINGS

The various advantages of the exemplary embodiments will become apparent to one skilled in the art by reading the following specification and appended claims, and by referencing the following drawings, in which:

Figure 4:
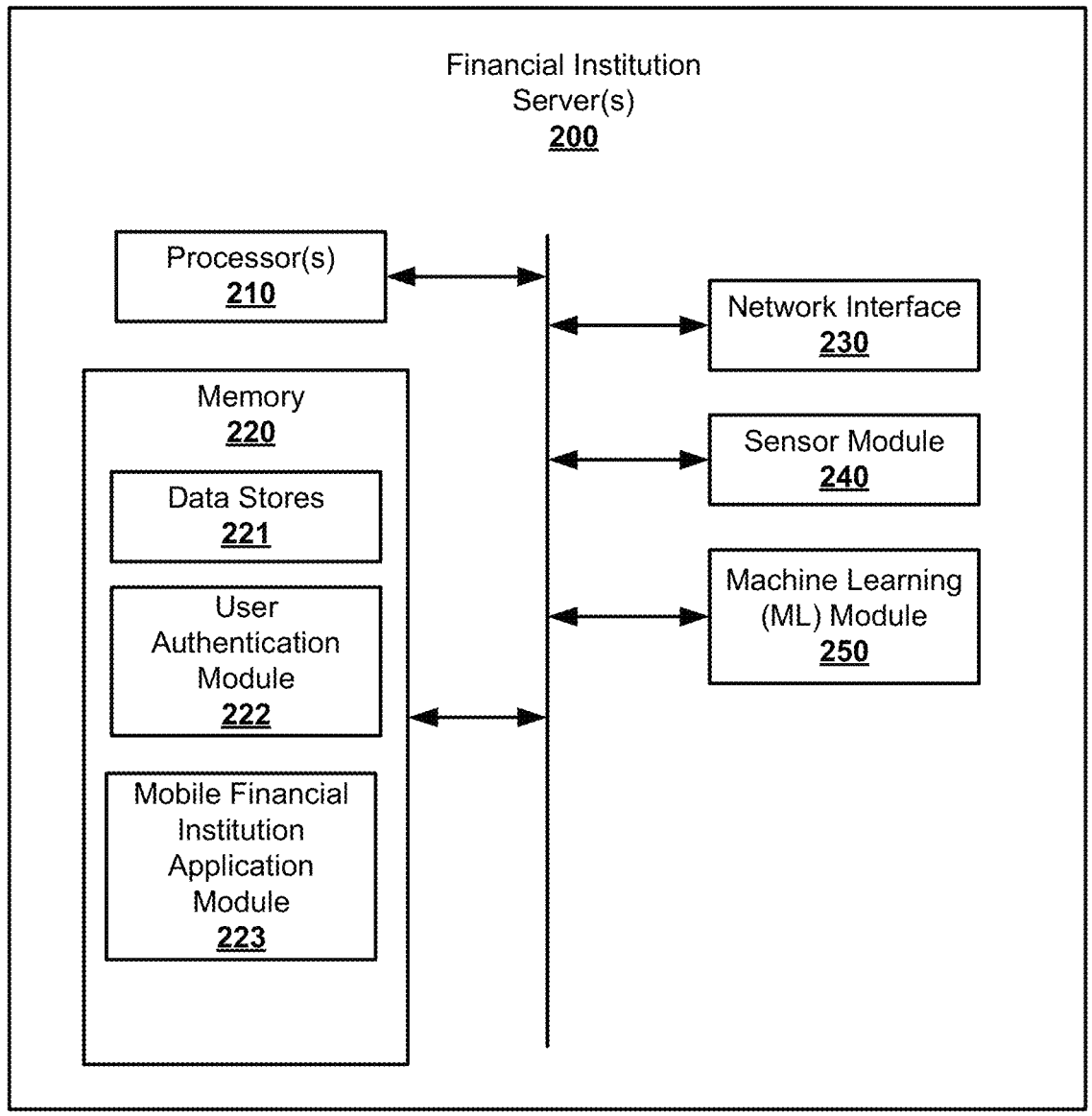
FIG. 4 illustrates a user interface of the client device of FIG. 1.
Figure 6:
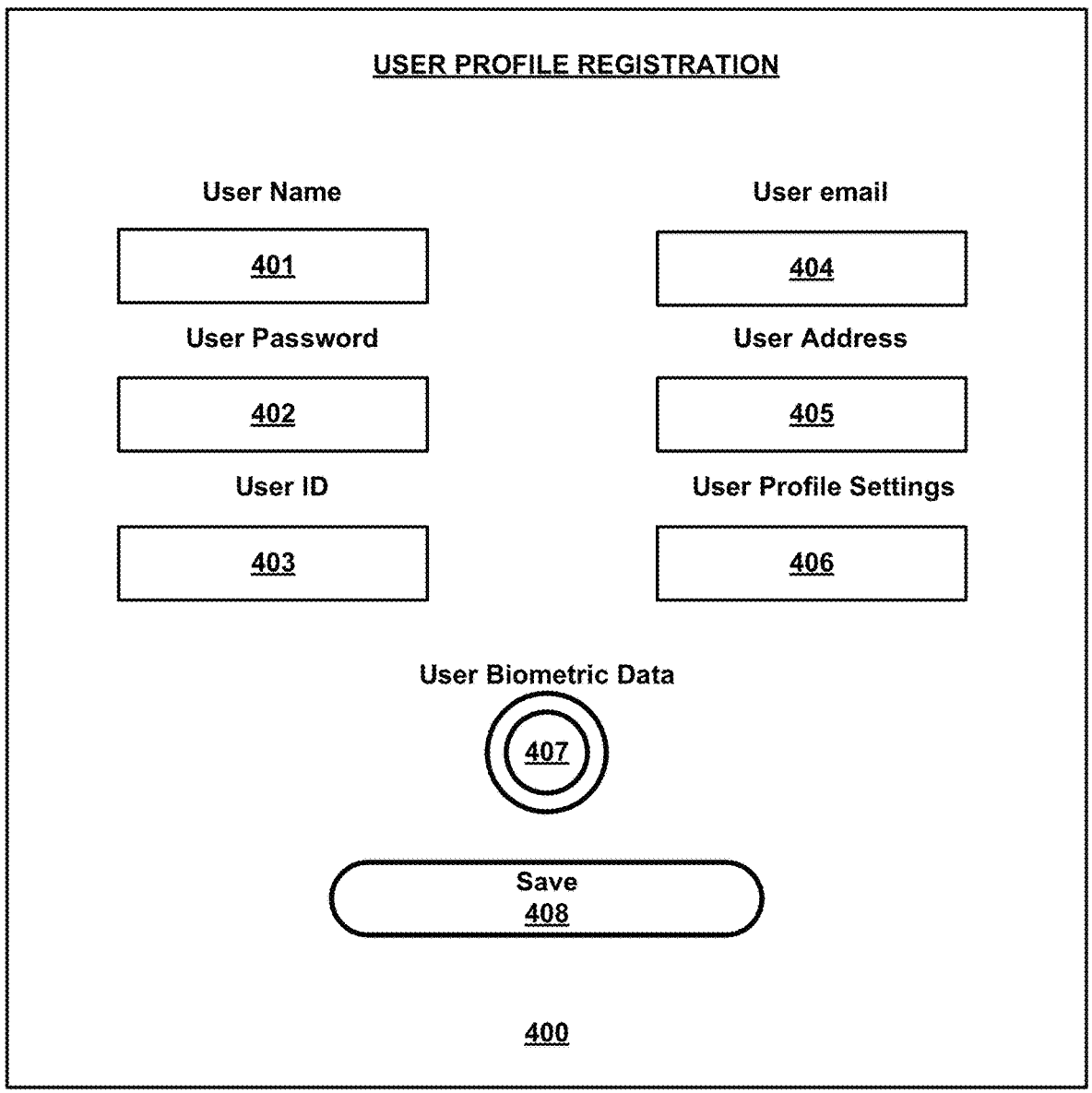
Figure 7:

FIGS. 6 and 7 respectively illustrate a user profile settings dashboard for visual display on the user interface of FIG. 4.

Figure 8:
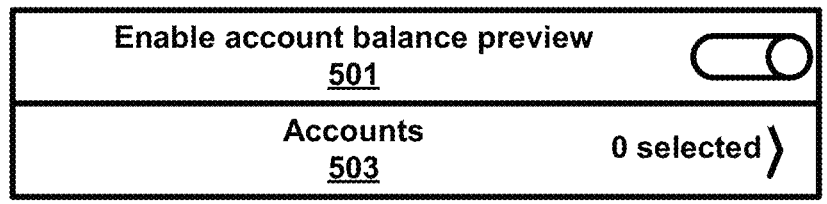

FIG. 8 illustrates a user account dashboard for visual display on the user interface of FIG. 4.

FIG. 9 illustrates a user profile settings dashboard for visual display on the user interface of FIG. 4.

Figure 1:
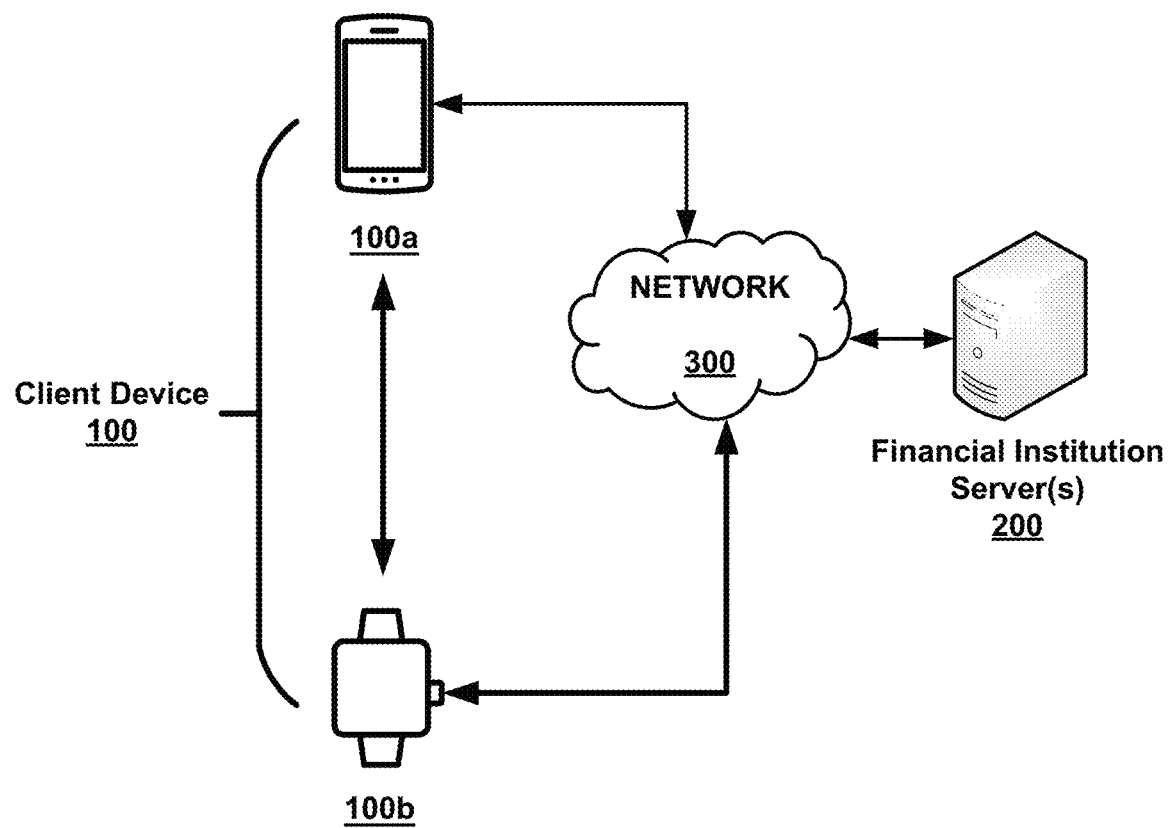
FIG. 1 illustrates a communication environment, in accordance with one or more embodiments set forth and described herein.
Figure 10:
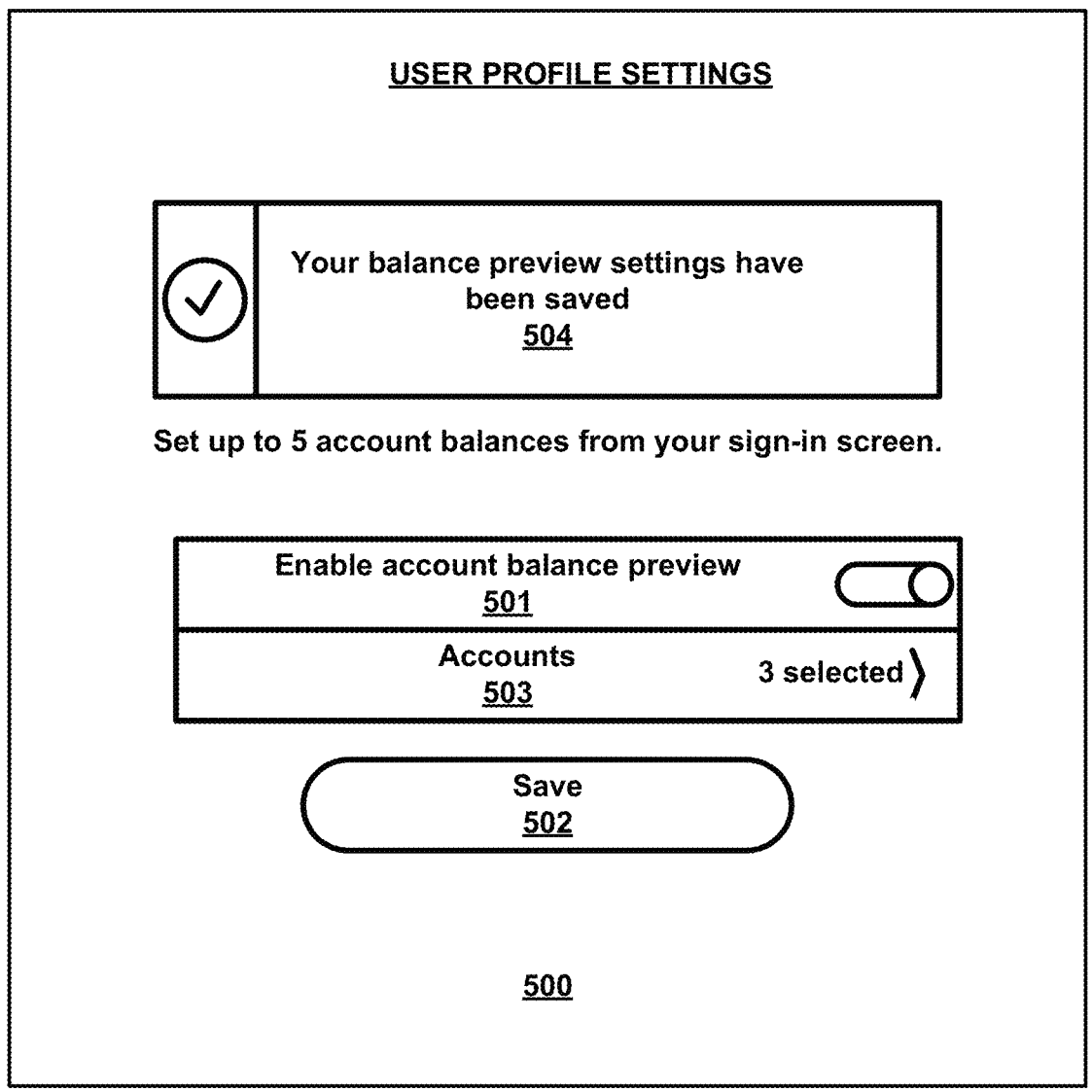

FIG. 10 illustrates a user interface of the client device of FIG. 1 that includes a financial institution home dashboard, in accordance with one or more embodiments set forth and described herein.

Figure 11:
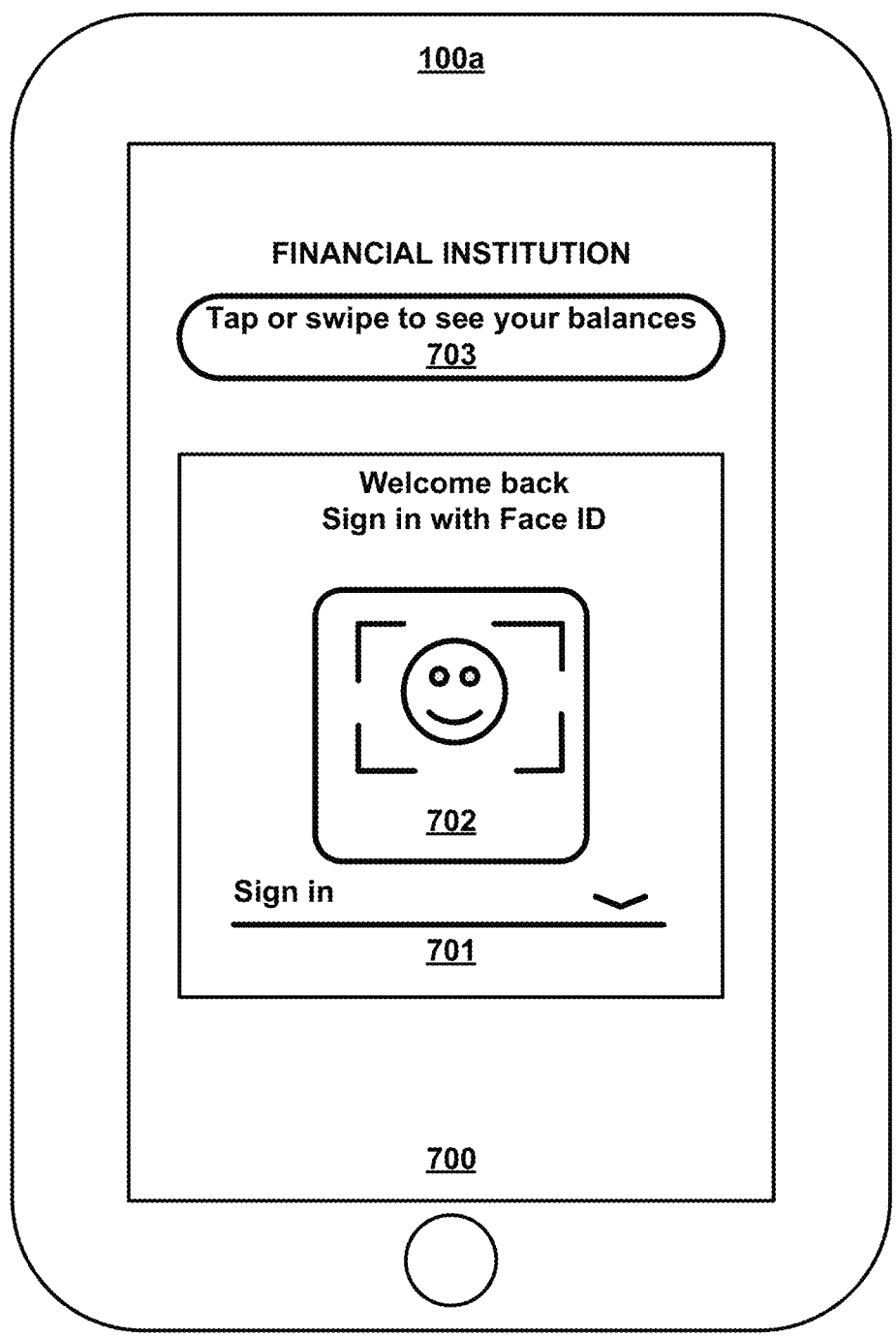

FIG. 11 illustrates a balance preview dashboard having one or more tiles that visually display one or more user account balances without user authentication, in accordance with one or more embodiments set forth and described herein.

FIGS. 12 through 15 respectively illustrate a computer-implemented method, in accordance with one or more embodiments set forth and described herein.

DESCRIPTION

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "dynamically" relates to events or actions that can be caused, triggered, or otherwise occur without human intervention.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code running on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

As used herein, "widget" relates to a graphical user interface (GUI) comprising electronic visual tiles that may be added to a home screen dashboard that are bigger than a regular application icon and have additional functionality. The widget may include shortcuts directly to popular features within a financial application.

A communication that facilitates enhanced user environment communication with a financial institution in support of user access and user management of one or more financial accounts at the financial institution. Upon the launching of a dashboard of financial institution on a client device, a user may transmit data related to the one or more financial accounts, and also receive data and information on one or more branch employees based on the geographic location of the user, or a user request or query for one or more financial services that are offered by the financial institution. Such data may be encrypted during communications between the first client device, the user-authorized, second client device, and the one or more financial services.

Turning to the figures, in which FIG. 1 illustrates a communication environment in which a user communicates with a financial institution over a communications network. A client device 100 that may include a first client device 100a and a second client device 100b operating in the communication environment facilitates user access to and user management of one or more financial accounts at one or more financial institution servers 200 of the financial institution. The communication environment includes the first client device 100b, the second client device 100b, the one or more financial institution servers 200, and a communication network 300 through which communication is facilitated between the first client device 100a, the second client device 100b, and the one or more financial institution servers 200.

In accordance with one or more embodiments set forth, described, and/or illustrated herein, the first client device 100a and the second client device 100b respectively comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the first client device 100a and the second client device 100b respectively comprising any form of electronic device that optimizes or otherwise transforms the performance and functionality of the one or more embodiments in a manner that falls within the spirit and scope of the principles of this disclosure.

In accordance with one or more embodiments set forth, described, and/or illustrated herein, each server in the one or more financial institution servers 200 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

Figure 2:
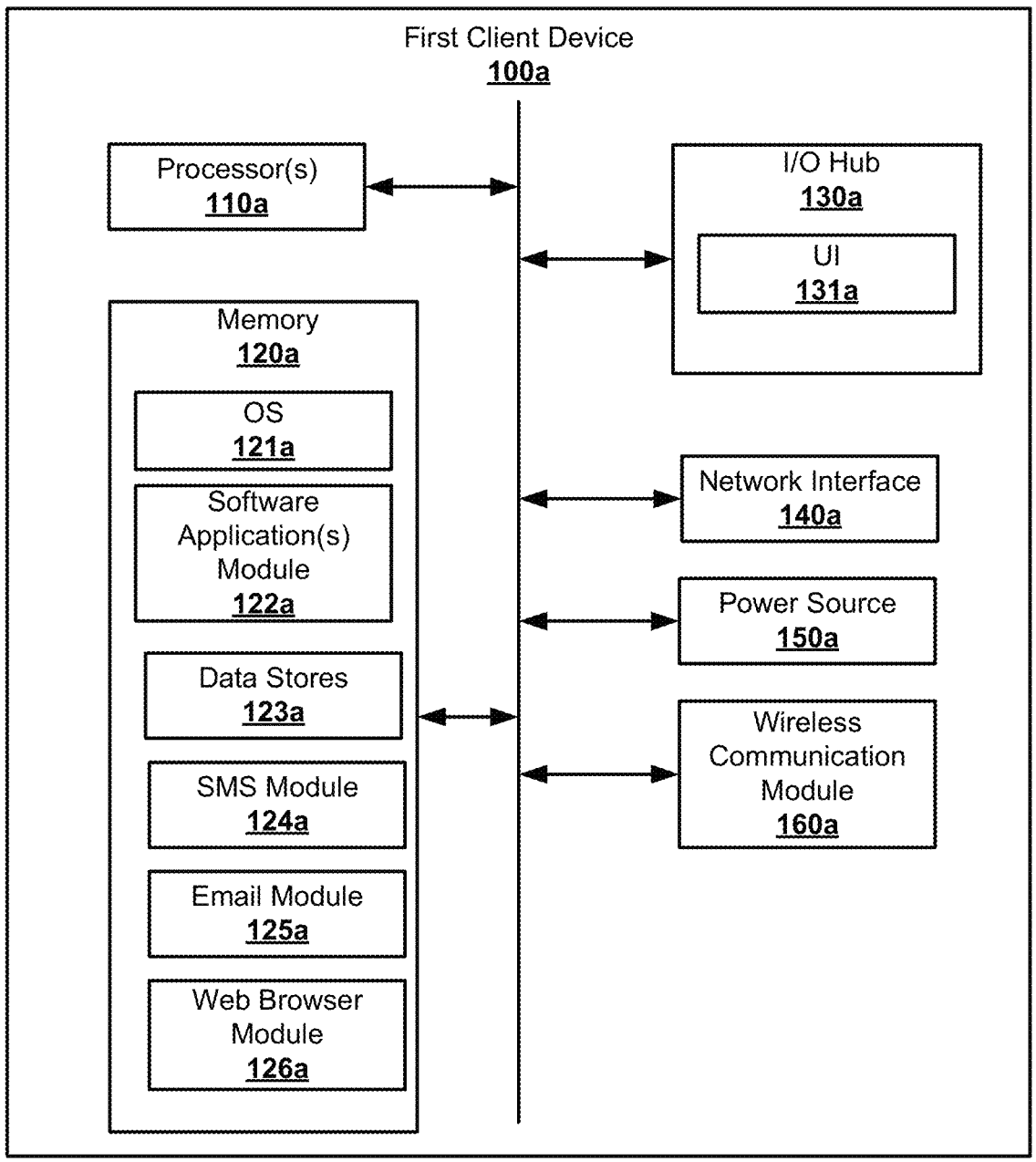
FIG. 2 illustrates a block diagram of the client device of FIG. 1.
Figure 3:
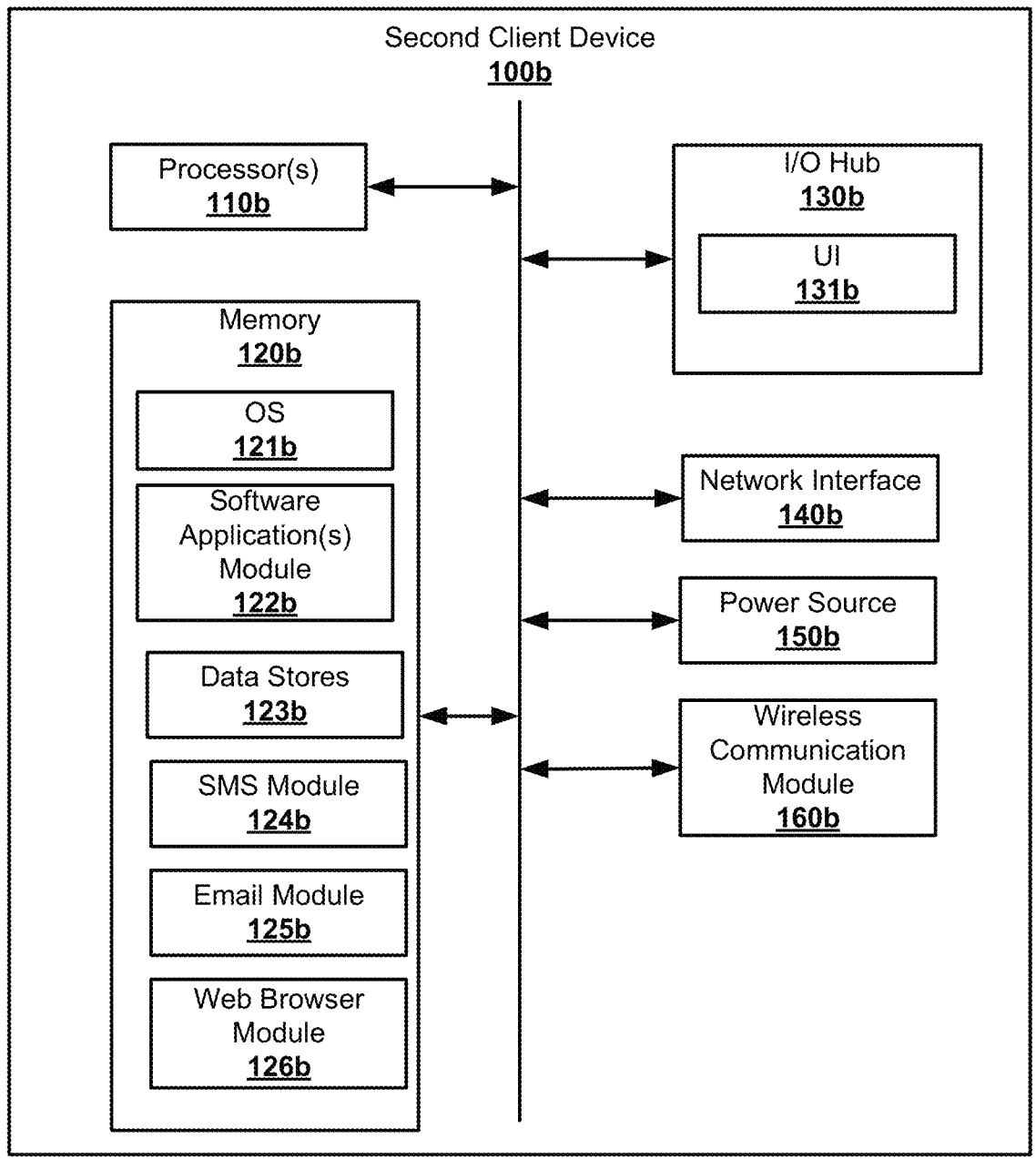
FIG. 3 illustrates a block diagram of the one or more financial institution servers of FIG. 1.

In the illustrated example embodiment of FIGS. 1 through 3, the first client device 100a comprises a mobile device, and the second client device 100b comprises a wearable device worn by the user, such as, for example, a smartwatch. Some of the possible operational elements of the first client device 100a and the second client device 100b are illustrated in FIGS. 2 and 3 and will now be described herein. It will be understood that it is not necessary for the first client device 100a to have all the elements illustrated in FIG. 2, or the second client device 100b to have all the elements illustrated in FIG. 3. For example, the first client device 100a may have any combination of the various elements illustrated in FIG. 2, and the second client device 100b may have any combination of the various elements illustrated in FIG. 3. Moreover, the first client device 100a may have additional elements to those illustrated in FIG. 2, and the second client device 100b may have additional elements to those illustrated in FIG. 3.

The first client device 100a and the second client device 100b respectively include one or more processors 110a, 110b, a non-transitory memory 120a, 120b operatively coupled to the one or more processors 110a, 110b, an I/O hub 130a, 130b, a network interface 140a, 140b, and a power source 150a, 150b.

The non-transitory memory 120a, 120b comprises a set of instructions of computer-executable program code. The set of instructions are executable by the one or more processors 110a, 110b to cause execution of an operating system 121a, 121b and one or more software applications of a software application module 122a, 122b that reside in the non-transitory memory 120a, 120b. The one or more software applications residing in the non-transitory memory 120a, 120b may include, but is not limited to, a financial institution application that is associated with the financial institution. The financial institution application comprises a mobile application that facilitates establishment of a secure connection between the first client device 100a, the second client device 100b, and the one or more financial institution servers 200. The one or more processors 110a, 110b are operable to execute the mobile application to facilitate user access to the one or more financial accounts and user management of the one or more financial accounts.

The non-transitory memory 120a, 120b also includes one or more data stores 123a, 123b that are operable to store one or more types of data. The first client device 100a and the second client device 100b may respectively include one or more interfaces that facilitate one or more systems or modules thereof to transform, manage, retrieve, modify, add, or delete, the data residing in the data stores 123a, 123b. The one or more data stores 123a, 123b may comprise volatile and/or non-volatile memory. Examples of suitable data stores 123 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a, 123b may be a component of the one or more processors 110a, 110b, or alternatively, may be operatively connected to the one or more processors 110a, 110b for use thereby. As set forth, described, and/or illustrated herein, "operatively connected" may include direct or indirect connections, including connections without direct physical contact.

The non-transitory memory 120a, 120b also includes an SMS module 124a, 124b operable to facilitate user transmission and receipt of text messages via the first client device 100a and the second client device 100b though the communication network 300. In one example embodiment, a user may receive text messages from the financial institution that are associated with the user access and the user management of the one or more financial accounts. An email module 125a, 125b is operable to facilitate user transmission and receipt of email messages via the first client device 100a and the second client device 100b through the communication network 300. In one example embodiment, a user may receive email messages from the financial institution that are associated with the user access and the user management of the one or more financial accounts. A user may utilize a web browser module 126a, 126b that is operable to facilitate user access to one or more websites associated with the financial institution through the communication network 300.

In accordance with one or more embodiments set forth, described, and/or illustrated herein, the first client device 100a and the second client device 100b includes an I/O hub 130a, 130b operatively connected to other systems and subsystems of the first client device 100a and the second client device 100b. The I/O system 130a, 130b may include one or more of an input interface, an output interface, and a network controller to facilitate communications between the first client device 100a, the second client device 100b, and the server 200. The input interface and the output interface may be integrated as a single, unitary user interface 131a, 131b, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a, 110b to execute instructions. The input interface may comprise a user interface (UI), a GUI, such as, for example, display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the client device 100 may serve as both a component of the input interface and a component of the output interface.

The first client device 100a and the second client device 100b includes a network interface 140a, 140b operable to facilitate connection to the communication network 300. The first client device 100a and the second client device 100b also include a power source 150a, 150b that comprises a wired powered source, a wireless power source, a replaceable battery source, or a rechargeable battery source. A wireless communication module 160a facilitates wireless communication and wireless pairing between the first client device 100a and another, third-party mobile device in a manner that facilitates a wireless exchange of data and information between the first client device 100a and a paired third-party mobile device. The wireless communication module 160b facilitates wireless communication and wireless pairing between the second client device 100b and another, third-party mobile device in a manner that facilitates a wireless exchange of data and information between the second client device 100b and a paired third-party mobile device.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure. The memory 220 comprises a set of instructions of computer-executable program code. The set of instructions are executable by the one or more processors 210 in manner that facilitates control of a user authentication module 222 and a mobile financial institution application module 223 having one or more mobile financial institution applications that reside in the memory 220. In accordance with one or more embodiments set forth, described, and/or illustrated herein, the one or more financial institution servers 200 may individually or collectively execute the instructions to perform any one or more of the methodologies set forth, described, and illustrated herein.

The memory 220 also includes one or more data stores 221 that are operable to store one or more types of data, including but not limited to, user account data, user authentication data, sensor data, etc. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the server(s) to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 223 are operable to communicate with the first client device 100*a* and/or the second client device 100*b* in a manner which facilitates user access to the one or more financial accounts in addition to user management of the one or more financial accounts based on successful user authentication. The data and information exchanged between the first client device 100*a*, the user-authorized second client device 100*b*, and the one or more financial institution servers 200 may be encrypted during communications therebetween.

The sensor module 240 is operable, at least during execution of the mobile application by the client device 100, to dynamically detect, determine, assess, monitor, measure, quantify, and/or sense information about the first client device 100*a* and the second client device 100*b*. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the first client device 100*a* and the second client device 100*b*.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the first client device 100*a*, the second client device 100*b*, and the one or more financial institution servers 200, while also enhancing user access and user management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the communication network 300 may comprise a wireless network, a wired network, or any suitable combination thereof. For example, the communication network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, the first client device 100*a*, the second client device 100*b*, and the one or more financial institution server(s) 200 could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine. Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

Any apparatus, computing device, computer program product, and computer-implemented method described herein may be at least partially processor-implemented, the one or more processors 210 being an example of hardware. For example, at least some of the operations of a method may be performed by one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

In accordance with one or more embodiments set forth, described, and/or illustrated herein, a user may, via the I/O hub 130a of the first client device 100a, launch or initialize execution of a financial institution mobile application over the communication network 300 for the purpose of registering a user profile. The user may already have one or more accounts with the financial institution, or otherwise seek to open one or more new accounts with the financial institution.

Figure 5:
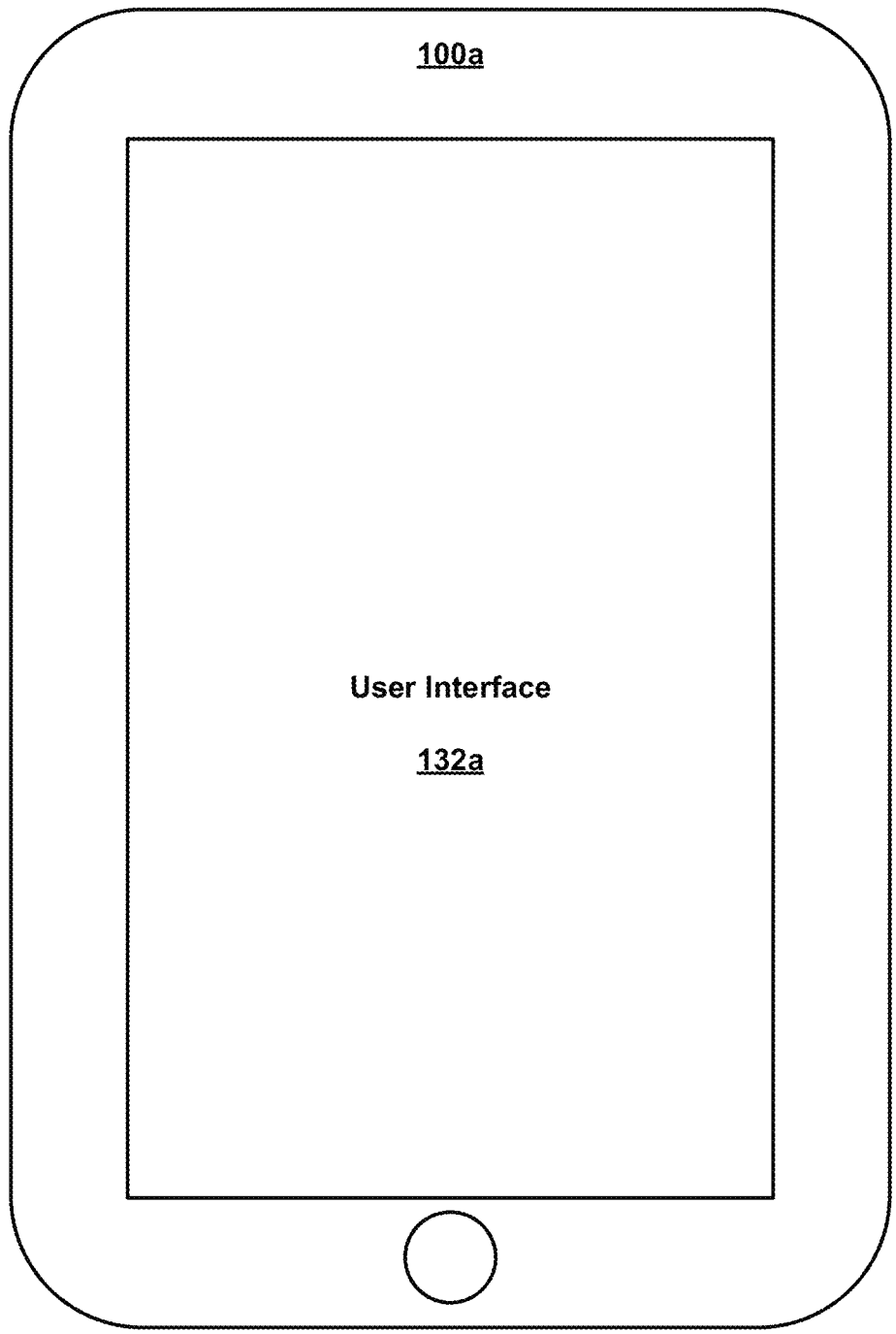
FIG. 5 illustrates a user profile registration dashboard for visual display on the user interface of FIG. 4.

As illustrated in FIGS. 5 and 6, the computer-executable program code may instruct the one or more processors 210 to cause (e.g., via the user authentication module 222) the display, generation, or rendering of a GUI comprising a user profile registration dashboard 400 for visual display on a user interface 132a of the first client device 100a. The computer-executable program code may instruct the one or more processors 210 to cause the user authentication module 222 to generate or otherwise render a plurality of user input fields on the user profile registration dashboard 400 to be populated by the user to facilitate registration of a user profile and authentication credentials with the financial institution. The plurality of user input fields includes, but is not limited to, a username input field 401, a user password input field 402, a user identification (ID) input field 403, a user email input field 404, a user address input field 405, a user profile settings input field 406, and a user biometric data field 407 (facial, fingerprint, voice, ocular, etc.). This disclosure contemplates visual presentation of the plurality of user input fields in any relevant combination.

As illustrated in FIG. 7, the computer-executable program code may instruct the one or more processors 210 to cause (e.g., via the user authentication module 222) the display, generation, or rendering of a GUI comprising a user profile settings dashboard 500 for visual display on the user interface 132a of the first client device 100a. The dashboard 500 may include a widget having a tile 501 with a user-engageable toggle switch to selectively enable or disable account balance preview by a user, and a user-engageable icon 502 to save the setting.

As illustrated in FIG. 8, responsive to the user selectively enabling the account balance preview, the computer-executable program code may instruct the one or more processors 210 to cause the display, generation, or rendering of a tile 503 having a user engageable arrowhead that allows the user to expand the list of financial accounts to enable or disable account balance preview without undergoing or otherwise bypassing the general user authentication protocols of the financial institution mobile application. In the illustrated embodiment, a threshold maximum limit of financial accounts that may be enabled for account balance preview without user authentication is five. This disclosure contemplates, however, the threshold maximum limit of financial accounts to be any number which optimizes or otherwise transforms the performance and functionality of the one or more embodiments in a manner that falls within the spirit and scope of the principles of this disclosure. The types of financial accounts subject to account balance preview without user authentication include, but is not limited to, any user account associated with a personal account, a commercial account, and a wealth management account. Example accounts may include, but is not limited to, checking accounts, savings accounts, credit accounts, money market accounts (MMA), certificates of deposit (CD), lines-of-credit, etc.

As illustrated in FIG. 9, responsive to the user selectively engaging the tile 502, the computer-executable program code may instruct the one or more processors 210 to cause the display, generation, or rendering of a GUI comprising a financial accounts dashboard 600 for visual display on the user interface 132a of the first client device 100a. The financial accounts dashboard 600 may comprise a widget having a plurality of tiles 601-606 that visually displays the financial accounts at the financial institution. Each tile 601-606 includes a user-engageable toggle switch to permit a user to selectively enable or disable account one or more financial accounts (up to the threshold maximum amount) that will be subject to balance preview without undergoing or otherwise bypassing the general user authentication process for the financial institution mobile application. The financial accounts dashboard 600 also includes a user-engageable icon 602 to save the settings, and a user-engageable icon 603 to reset the settings.

As illustrated in FIG. 10, responsive to the user enabling and saving the financial accounts intended to be subject to account balance preview, the computer-executable program code may instruct the one or more processors 210 to cause the display, generation, or rendering of the profile settings dashboard 500 for visual display on the user interface 132a of the first client device 100a, and includes a widget 504 that visually indicates or confirms that the account balance preview settings have been saved. The tile 503 has also been changed to visually indicate the overall number of financial accounts 601-606 that have been enabled to permit account balance preview.

In accordance with one or more embodiments set forth, described, and/or illustrated herein, the computer-executable program code may also instruct the one or more processors 210 to cause storage in the one or more data stores 221 the data, information, and authentication credentials in the user profile registration dashboard 400, the user profile settings dashboard 500, and the financial accounts dashboard 600.

In accordance with one or more embodiments set forth, described, and/or illustrated herein, the computer-executable program code may, subsequent to a user completing user profile registration, instruct the one or more processors 210 to cause the sensor module 240 to detect the financial institution mobile application running on or installed in the first client device 100a. Such detection may occur in instances where the financial institution mobile application running in the background of the first client device 100a. Such detection may be conducted based on a detection of metadata that includes one or more of: the electronic footprint of the financial institution mobile application, and the client device information (e.g., hardware type, OS, and client device name, etc.). This disclosure contemplates other forms of software detection that optimizes or otherwise transforms the performance and functionality of the one or more embodiments in a manner that falls within the spirit and scope of the principles of this disclosure.

In accordance with one or more embodiments set forth, described, and/or illustrated herein, the computer-executable program code may, responsive to the detection, instruct the one or more processors 210 to determine whether the account balance preview for display on the first client device 100a is enabled by the user. This determination may occur based on analysis of the user profile data stored in the one or more data stores 221. This disclosure contemplates the detection of the financial institution mobile application running on or installed in the first client device 100a and the determination of user-enablement of the account balance preview to be executed concurrently or otherwise in parallel to each other.

As illustrated in FIG. 11, the computer-executable program code may, responsive to the detection of the financial institution mobile application running on or installed in the first client device 100a and the determination of user-enablement of the account balance preview, instruct the one or more processors 210 to cause, on a GUI comprising a financial institution home dashboard 700 of the financial institution mobile application, the display, generation, or rendering of a widget for visual display on the user interface 132a of the first client device 100a. The widget includes a sign-in icon 701 that includes a user-engageable arrowhead that allows the user log into an existing user account, or create a new user account. The widget also includes a biometric data field 702 that permits a user to authenticate using biometric data.

In accordance with one or more embodiments set forth, described, and/or illustrated herein, the computer-executable program code may, responsive to the detection of the financial institution mobile application running on or installed in the first client device 100a and the determination of user-enablement of the account balance preview, instruct the one or more processors 210 to cause, on the financial institution home dashboard 700, the generation or rendering of a user-engageable icon 703 for visual display on the user interface 132a of the first client device 100a.

In accordance with one or more embodiments set forth, described, and/or illustrated herein, the computer-executable program code may also instruct the one or more processors 210 to detect a wireless pairing between the first client device 100a and a user-authorized, third-party device. The third-party device becomes a user-authorized third-party device by virtue of its registration with the financial institution mobile application. In the illustrated embodiment, the user-authorized, third-party device comprises the second client device 100b. The detection may be based upon receipt of, via the communications network 300, pairing information associated with the first client device 100a and the user-authorized, third-party device (i.e., the second client device 100b). The pairing information may include, but is not limited to, geographic location information (e.g., using Global Positioning System (GPS) data received from the first client device 100a and the user-authorized, third-party device).

As illustrated in FIG. 12, the computer-executable program code may, responsive to user engagement of the icon 703 and the detection of the pairing between the first client device 100a and the user-authorized, third-party device (i.e., the second client device 100b), instruct the one or more processors 210 to cause the one or more financial institution servers 200 to cause a display, generation, or rendering of a GUI comprising a balance preview dashboard 800 for visual display on the user interface 132b of the second client device 100b. The balance preview dashboard 800 may comprise a widget having one or more tiles 801, 802, 803 that visually displays a balance preview of the enabled financial accounts without undergoing or otherwise bypassing the general user authentication protocols of the financial institution mobile application. Accordingly, a user, having previously enabled account preview on the first client device 100a, may enable preview of one or account balances at the financial institution on a paired, user-authorized, third-party device (i.e., the second client device 100b) without providing user profile credentials or user authentication credentials.

Figure 13:
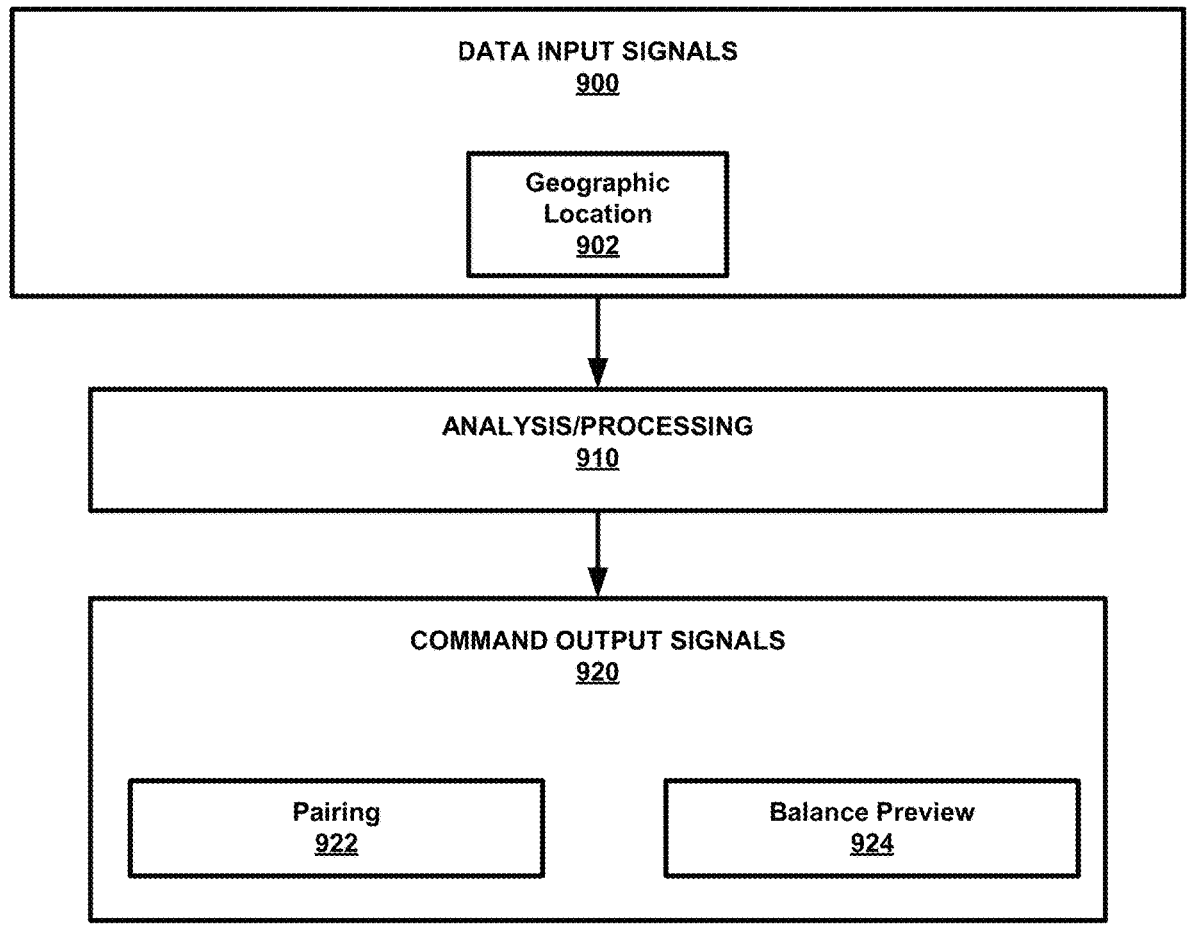

As illustrated in FIG. 13, in accordance with one or more embodiments set forth, described, and/or illustrated herein, one or more servers in the one or more financial institution servers 200 may comprise surrogate servers that also facilitate the pairing between the first client device 100a and a user-authorized, third-party device (i.e., the second client device 100b). The computer-executable program code may instruct the one or more processors 210 to cause, via the sensor module 240, the one or more financial institution servers 200 to detect a current geographic position of the first client device 100a and the user-authorized, third-party device (i.e., the second client device 100b). The geographic position data is acquired as a data input signal 902. The detection may be based on sensor data, wireless network data, and stored data. The sensor data includes, but is not limited to, geographic location data acquired using Global Positioning System (GPS) data received from the first client device 100a and the user-authorized, third-party device. The geographic positions of the first client device 100a and the user-authorized, third-party device (i.e., the second client device 100b) may be based on access point geolocation services, such as using the W3C Geolocation Application Programming Interface (API). With such a system, the location of the first client device 100a and the user-authorized, third-party device (i.e., the second client device 100b) may be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. This disclosure contemplates the specific manner in which the geographic position is determined comprising any suitable process or system that optimizes or otherwise transforms the performance and functionality of the one or more embodiments in a manner that falls within the spirit and scope of the principles of this disclosure.

In accordance with one or more embodiments set forth, described, and/or illustrated herein, the computer-executable program code may instruct the one or more processors 210 to cause the one or more financial institution servers 200 to conduct analysis 910 of the sensor data, the wireless network data, and the stored data. The analysis may include determining a current spatial proximity between the first client device 100a and the user-authorized, third-party device (i.e., the second client device 100b). Determining the spatial proximity may comprise calculating, based on the detected current geographic position of the first client device 100a and the user-authorized, third-party device (i.e., the second client device 100b), a current distance (Dc) between the first client device 100a and the user-authorized, third-party device (i.e., the second client device 100b). The analysis may also include conducting a comparison between the calculated distance (Dc) and a predetermined threshold distance (Dt). The predetermined threshold distance can be in a range between 5 to 10 feet. Embodiments, however, are not limited thereto. This disclosure contemplates the use of any suitable predetermined threshold distance that optimizes or otherwise transforms the performance and functionality of the one or more embodiments in a manner that falls within the spirit and scope of the principles of this disclosure.

In accordance with one or more embodiments set forth, described, and/or illustrated herein, in response to a comparison that the calculated distance is within the predetermined threshold distance, the computer-executable program code may instruct the one or more processors 210 to cause the one or more financial institution servers 200 to determine whether the calculated distance is maintained for a predetermined threshold time period. The predetermined threshold time period (Tt) can be in a range between 5 to 10 seconds. Embodiments, however, are not limited thereto. This disclosure contemplates the use of any suitable predetermined threshold time period that optimizes or otherwise transforms the performance and functionality of the one or more embodiments in a manner that falls within the spirit and scope of the principles of this disclosure.

In accordance with one or more embodiments set forth, described, and/or illustrated herein, responsive to a determination that comparison that the calculated distance is maintained for the predetermined time period, the computer-executable program code may instruct the one or more processors 210 to cause (via one or more command output signals 910) the one or more financial institution servers 200 to pair 922 the first client device 100a and the user-authorized, third-party device (i.e., the second client device 100b). This disclosure contemplates performing pairing between the first client device 100a and the user-authorized, third-party device (i.e., the second client device 100b) using suitable any wireless standard that optimizes or otherwise transforms the performance and functionality of the one or more embodiments in a manner that falls within the spirit and scope of the principles of this disclosure.

In accordance with one or more embodiments set forth, described, and/or illustrated herein, responsive to the pairing of the first client device 100a and the user-authorized, third-party device (i.e., the second client device 100b), the computer-executable program code may instruct the one or more processors 210 to cause (via one or more command output signals 910) the one or more financial institution servers 200 to cause the visually display of the balance preview 924 of the enabled financial accounts on the user interface 132b of the paired, user-authorized, third-party device (i.e., the second client device 100b) without undergoing or otherwise bypassing the general user authentication protocols of the financial institution mobile application.

Figure 14:
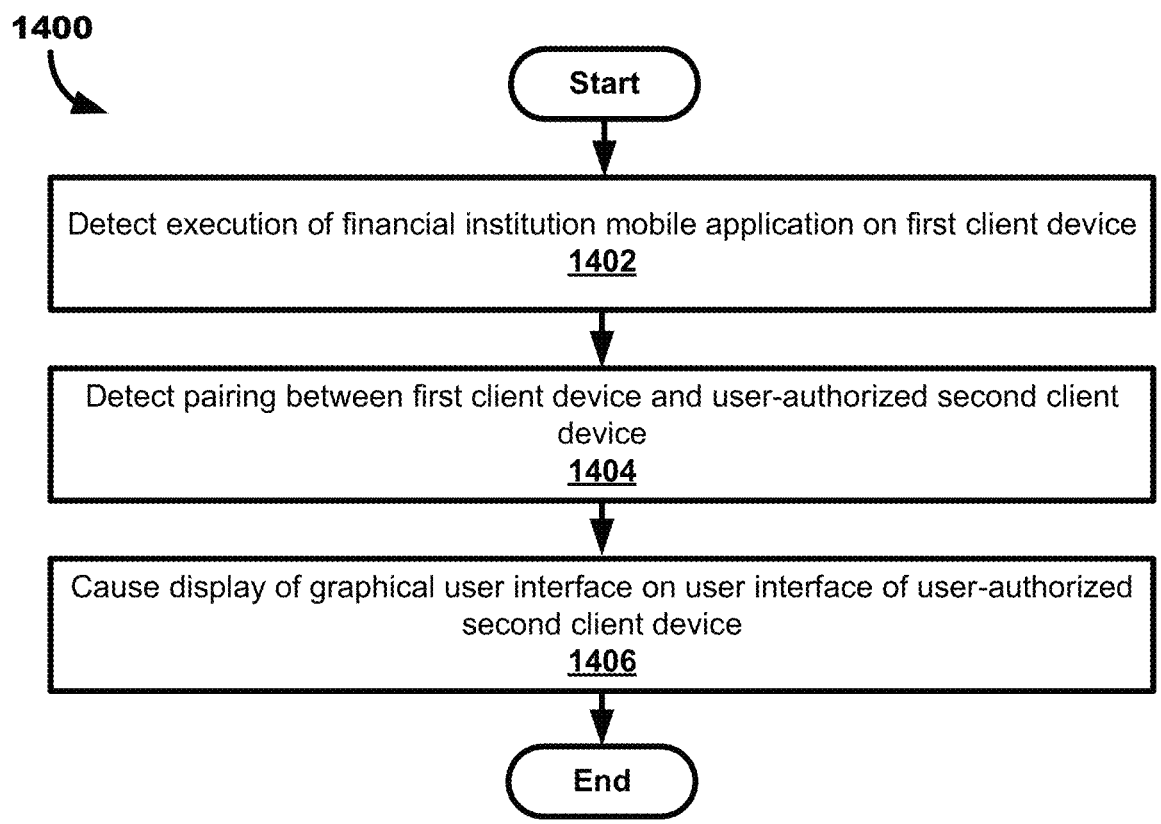
Figure 15:
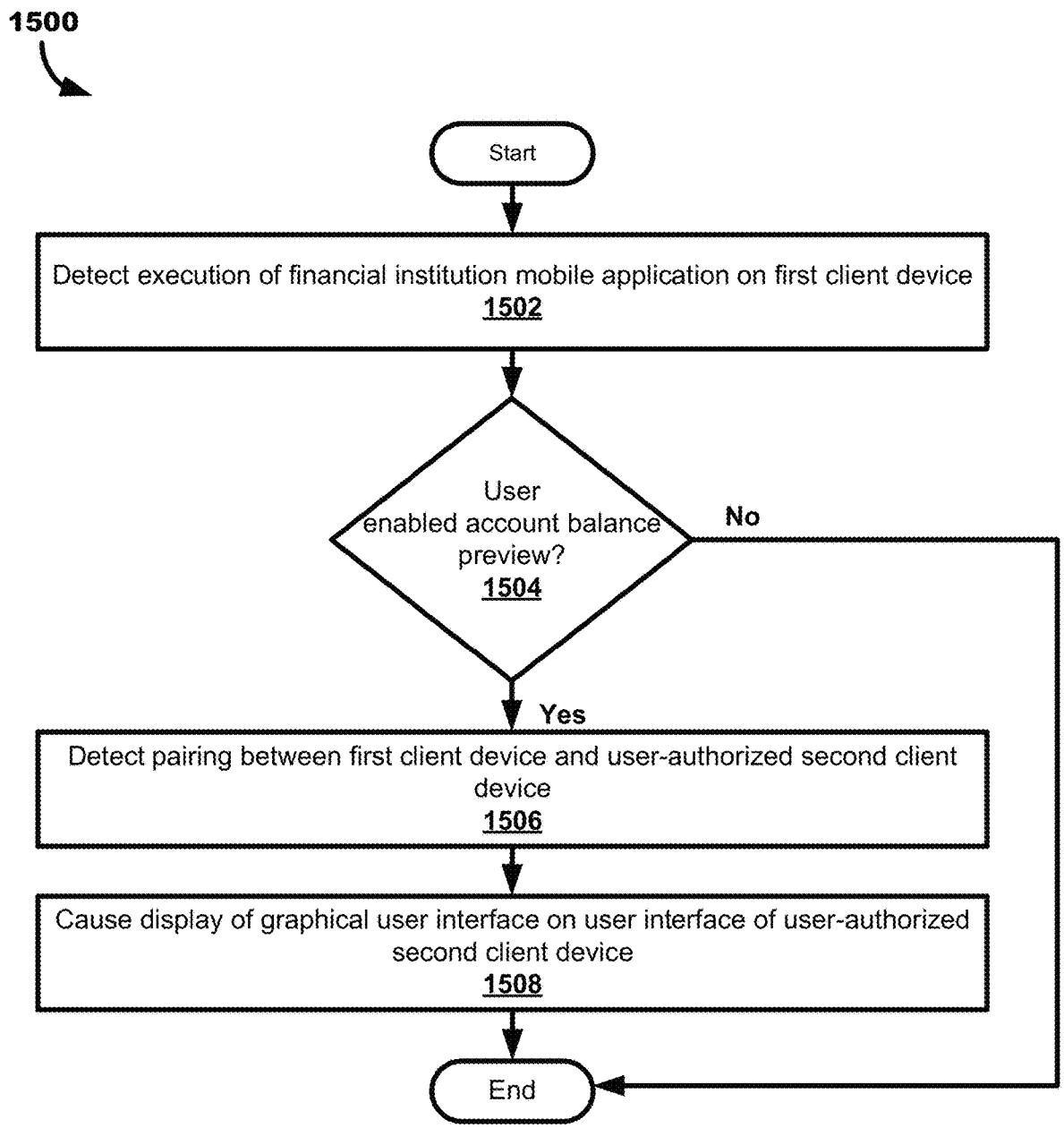
Figure 16:
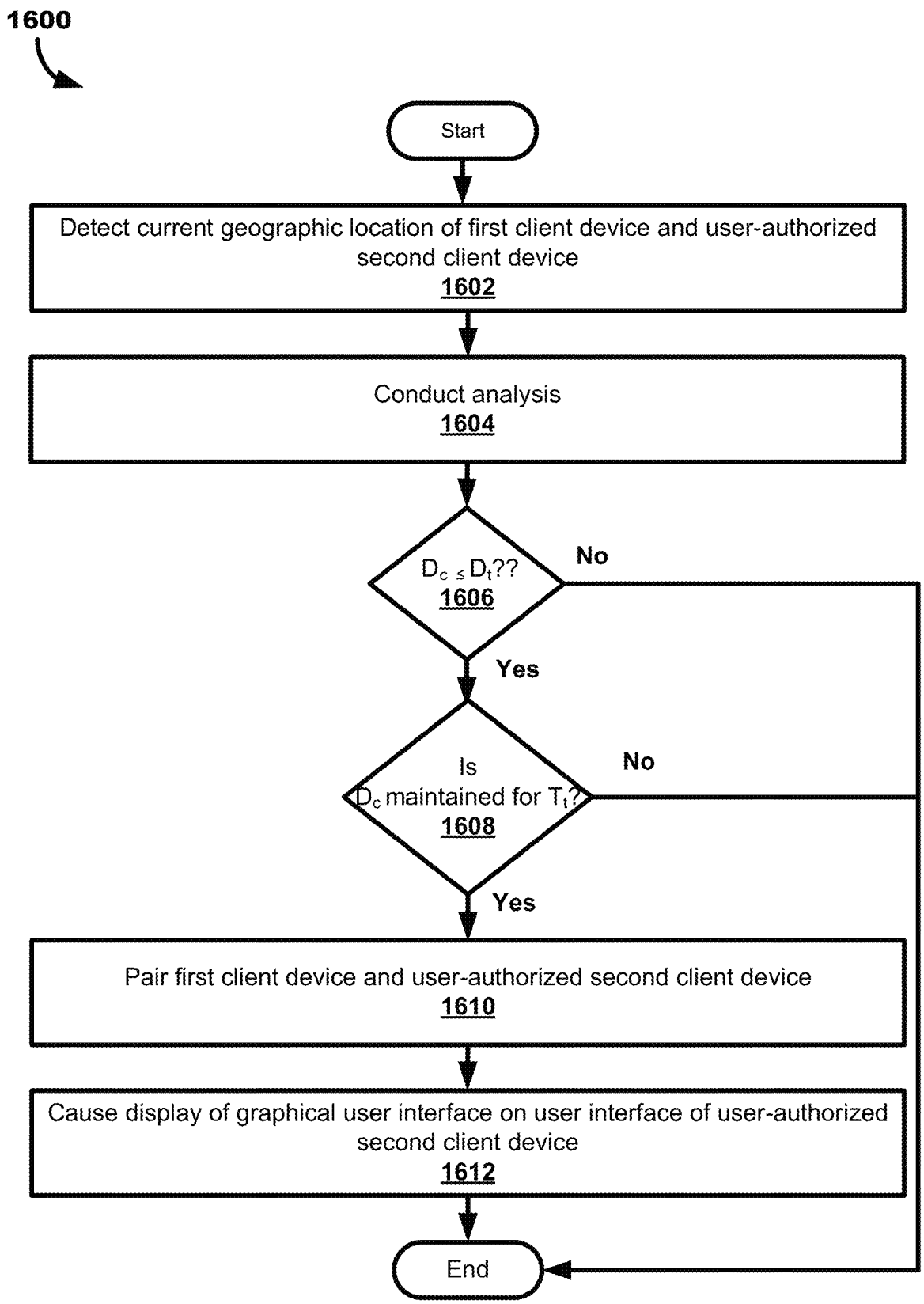

Illustrated examples shown in FIGS. 14 to 16 set forth computer-implemented methods 1400, 1500, and 1600. In one or more examples, the respective flowcharts of the computer-implemented methods 1400, 1500, and 1600 may be implemented by the one or more processors 210 of the one or more financial institution servers 200. In particular, the computer-implemented methods 1400, 1500, and 1600 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 1400, 1500, and 1600 set forth, described, and/or illustrated herein, or provides functionality set forth, described, and/or illustrated.

As illustrated in FIG. 14, illustrated process block 1402 includes detecting, by one or more financial institution servers associated with a financial institution, execution of a mobile application associated with the financial institution on a first client device of a user having one or more financial accounts at the financial institution.

The computer-implemented method 1400 may then proceed to illustrated process block 1404, which includes detecting, by the one or more financial institution servers, pairing between the first client device and a user-authorized, second client device.

The computer-implemented method 1400 may then proceed to illustrated process block 1406, which includes causing, by the one or more financial institution servers in response to the detection of the pairing and without receipt of user authentication credentials, display of a GUI on a user interface of the user-authorized second client device to visually display one or more account balances associated with the one or more financial accounts.

The computer-implemented method 1400 may terminate or end after execution of process block 1406.

As illustrated in FIG. 15, illustrated process block 1502 includes detecting, by one or more financial institution servers associated with a financial institution, execution of a mobile application associated with the financial institution on a first client device of a user having one or more financial accounts at the financial institution.

The computer-implemented method 1500 may then proceed to illustrated process block 1504, which includes determining, by the one or more financial institution servers, whether the user has enabled account balance preview without user authentication.

If "No," i.e., should the one or more financial institution servers determine that the user has not enabled account balance preview without user authentication, the computer-implemented method 1500 then may terminate or end.

If "Yes," i.e., should the one or more financial institution servers determine that the user has enabled account balance preview without user authentication, the computer-implemented method 1500 then proceeds to process block 1506, which includes detecting, by the one or more financial institution servers, pairing between the first client device and a user-authorized, second client device.

The computer-implemented method 1500 may then proceed to illustrated process block 1508, which includes causing, by the one or more financial institution servers in response to the detection of the pairing and without receipt of user authentication credentials, display of a GUI on a user interface of the user-authorized second client device to visually display one or more account balances associated with the one or more financial accounts.

The method 1500 may terminate or end after execution of process block 1508.

As illustrated in FIG. 16, illustrated process block 1602 includes detecting, by one or more financial institution servers associated with a financial institution, a current geographic location of a first client device of a user having one or more financial accounts at the financial institution, and a user-authorized second client device.

The computer-implemented method 1600 may then proceed to illustrated process block 1604, which includes conducting, by the one or more financial institution servers, analysis of sensor data, wireless network data, and stored data.

In accordance with illustrated process block 1604, the analysis comprises determining, by the one or more financial institution servers, a current spatial proximity between the first client device and the user-authorized, second client device.

In accordance with illustrated process block 1604, determining the spatial proximity may comprise calculating, by the one or more financial institution servers based on the detected current geographic position of the first client device and the user-authorized, second client device, a current distance (Dc) between the first client device and the user-authorized, second client device.

The computer-implemented method 1600 may then proceed to illustrated process block 1606, which includes conducting, by the one or more financial institution servers, a comparison between the calculated distance (Dc) and a predetermined threshold distance (Dt).

If "No," i.e., should the comparison result in the calculated distance (Dc) being greater than the predetermined threshold distance (Dt), the computer-implemented method 1600 then may terminate or end.

If "Yes," i.e., should the comparison result in the calculated distance (Dc) being less than or equal to the predetermined threshold distance (Dt), the computer-implemented method 1600 then proceeds to process block 1608, which includes determining whether the calculated distance (Dc) is maintained for a predetermined threshold time period (Tt).

If "No," i.e., should the determination result in the calculated distance (Dc) being maintained for less than the predetermined threshold time period (Tt), the computer-implemented method 1600 then may terminate or end.

If "Yes," i.e., should the determination result in the calculated distance (Dc) being maintained for the predetermined threshold time period (Tt), the computer-implemented method 1600 then proceeds to process block 1610, which includes causing, by the one or more financial institution servers, a pairing between the first client device and the user-authorized, second client device.

The computer-implemented method 1600 may then proceed to illustrated process block 1612, which includes causing, by the one or more financial institution servers in response to the pairing and without receipt of user authentication credentials, display of a GUI on a user interface of the user-authorized second client device to visually display one or more account balances associated with the one or more financial accounts.

The method 1600 may terminate or end after execution of process block 1612.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A server computing system, comprising:
   one or more processors; and
   a non-transitory memory coupled to the one or more processors, the non-transitory memory including a set of instructions of computer-executable program code, which when executed by the one or more processors, cause the one or more processors of the server computing system to perform actions including:

detecting, by the server computing system, launching of a financial institution mobile application on a first client device of a user having one or more financial accounts at the financial institution;

authenticating, by the server computing system, the first client device;

analyzing, by the server computing system, in response to authenticating the first client device, proximity data between the first client device and a user-authorized, unauthenticated second client device;

determining, by the server computing system, responsive to the analysis, that a spatial proximity between the first client device and the user-authorized, unauthenticated second client device is within a threshold proximity;

facilitating pairing, by the server computing system, responsive to the detection of the launching of the financial institution mobile application having the spatial proximity between the first client device and the user-authorized, unauthenticated second client device within the threshold proximity, between the first client device and the user-authorized, unauthenticated second client device;

receiving, by the server computing system from one of the first client device and the user-authorized, unauthenticated second client device, pairing information of the first client device and the user-authorized, unauthenticated second client device;

concurrently detecting launching of the financial institution mobile application and detecting the pairing between the first client device and the user-authorized, unauthenticated second client device based upon, at least in part, an electronic footprint of the first client device; and generating, based on receiving the pairing information of the first client device and the user-authorized, unauthenticated second client device, a graphical user interface on a user interface of the user-authorized, unauthenticated second client device to visually display one or more account balances associated with the one or more financial accounts while bypassing, by the server computing system, authentication protocols of the financial institution mobile application for the user-authorized, unauthenticated second client device.

2. The server computing system of claim 1, wherein the user-authorized, unauthenticated second client device comprises a wearable electronic device worn by the user.

3. The server computing system of claim 2, wherein the wearable electronic device comprises a smartwatch.

4. The server computing system of claim 1, wherein the set of instructions, which when executed by the one or more processors, cause the one or more processors to perform actions including conducting, temporally before generating the graphical user interface, user profile analysis of user profile data that is stored in the non-transitory memory to determine whether an account balance preview is enabled by the user.

5. The server computing system of claim 4, wherein the graphical user interface is generated in response to a determination that the account balance preview is enabled.

6. A computer program product comprising at least one non-transitory computer readable medium having with a set of instructions of computer-executable program code, which when executed by one or more processors of a computing device, cause the one or more processors of the computing device to perform actions comprising:

detecting launching of a financial institution mobile application on a first client device of a user having one or more financial accounts at the financial institution;

authenticating the first client device;

analyzing, in response to authenticating the first client device, proximity data between the first client device and a user-authorized, unauthenticated second client device;

determining, responsive to the analysis, that a spatial proximity between the first client device and the user-authorized, unauthenticated second client device is within a threshold proximity;

facilitating pairing, by the server computing system, responsive to the detection of the launching of the financial institution mobile application having the spatial proximity between the first client device and the user-authorized, unauthenticated second client device within the threshold proximity, between the first client device and the user-authorized, unauthenticated second client device;

receiving, by the server computing system from one of the first client device and the user-authorized, unauthenticated second client device, pairing information of the first client device and the user-authorized, unauthenticated second client device;

concurrently detecting launching of the financial institution mobile application and detecting the pairing between the first client device and the user-authorized, unauthenticated second client device based upon, at least in part, an electronic footprint of the first client device; and generating, based on receiving the pairing information of the first client device and the user-authorized, unauthenticated second client device, a graphical user interface on a user interface of the user-authorized, unauthenticated second client device to visually display one or more account balances associated with the one or more financial accounts while bypassing, by the server computing system, authentication protocols of the financial institution mobile application for the user-authorized, unauthenticated second client device.

7. The computer program product of claim 6, wherein the user-authorized, unauthenticated second client device comprises a wearable electronic device worn by the user.

8. The computer program product of claim 7, wherein the wearable electronic device comprises a smartwatch.

9. The computer program product of claim 6, wherein the set of instructions, which when executed by the one or more processors, cause the one or more processors to perform actions comprising conducting, temporally before generating the graphical user interface, user profile analysis of user profile data that is stored in the non-transitory computer readable medium to determine whether an account balance preview is enabled by the user.

10. The computer program product of claim 9, wherein the graphical user interface is generated in response to a determination that the account balance preview is enabled.

11. A computer-implemented method, comprising:

detecting, by a server computing system launching of a financial institution mobile application on a first client device of a user having one or more financial accounts at the financial institution;

authenticating, by the server computing system, the first client device;

analyzing, by the server computing system in response to authenticating the first client device, proximity data between the first client device and a user-authorized, unauthenticated second client device;

determining, by the server computing system responsive to the analysis, that a spatial proximity between the first client device and the user-authorized, unauthenticated second client device is within a threshold proximity;

facilitating pairing, by the server computing system, responsive to the detection of the launching of the financial institution mobile application having the spatial proximity between the first client device and the user-authorized, unauthenticated second client device within the threshold proximity, between the first client device and the user-authorized, unauthenticated second client device;

receiving, by the server computing system from one of the first client device and the user-authorized, unauthenticated second client device, pairing information of the first client device and the user-authorized, unauthenticated second client device;

concurrently detecting launching of the financial institution mobile application and detecting the pairing between the first client device and the user-authorized, unauthenticated second client device based upon, at least in part, an electronic footprint of the first client device; and generating, based on receiving the pairing information of the first client device and the user-authorized, unauthenticated second client device, a graphical user interface on a user interface of the user-authorized, unauthenticated second client device to visually display one or more account balances associated with the one or more financial accounts while bypassing, by the server computing system, authentication protocols of the financial institution mobile application for the user-authorized, unauthenticated second client device.

12. The computer-implemented method of claim 11, wherein the user-authorized, unauthenticated second client device comprises a wearable electronic device worn by the user.

13. The computer-implemented method of claim 12, wherein the wearable electronic device comprises a smartwatch.

14. The computer-implemented method of claim 11, further comprising conducting, by the server computing system temporally before generating the graphical user interface, user profile analysis of user profile data that is stored in non-transitory memory to determine whether an account balance preview is enabled by the user.

15. The computer-implemented method of claim 14, wherein:
the graphical user interface is generated in response to a determination that the account balance preview is enabled.

* * * * *